(12) United States Patent
Sugisawa

(10) Patent No.: US 11,804,726 B2
(45) Date of Patent: Oct. 31, 2023

(54) IN-VEHICLE AUXILIARY POWER SOURCE CONTROL DEVICE AND IN-VEHICLE AUXILIARY POWER SOURCE DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Yuuki Sugisawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 546 days.

(21) Appl. No.: 17/044,836

(22) PCT Filed: Apr. 8, 2019

(86) PCT No.: PCT/JP2019/015279
§ 371 (c)(1),
(2) Date: Oct. 1, 2020

(87) PCT Pub. No.: WO2019/208183
PCT Pub. Date: Oct. 31, 2019

(65) Prior Publication Data
US 2021/0135481 A1 May 6, 2021

(30) Foreign Application Priority Data
Apr. 27, 2018 (JP) .................................. 2018-086315

(51) Int. Cl.
*H01M 10/46* (2006.01)
*H02J 7/04* (2006.01)
(Continued)

(52) U.S. Cl.
CPC .................. *H02J 7/04* (2013.01); *B60K 1/04* (2013.01); *B60L 50/60* (2019.02);
(Continued)

(58) Field of Classification Search
CPC .. H02J 7/04; H02J 7/007192; H02J 7/007194; H01M 10/48; H01M 10/625;
(Continued)

(56) References Cited

U.S. PATENT DOCUMENTS 7,097,934 B2    8/2006 Shigeta et al.
2015/0239405 A1*  8/2015 Kaihara ................. B60L 53/18
                                                                 219/202

(Continued)

FOREIGN PATENT DOCUMENTS

JP   2014-238966 A   12/2014
WO   WO-2017208792 A1 * 12/2017 .......... H01M 10/425

OTHER PUBLICATIONS

International Search Report, Application No. PCT/JP2019/015279, dated Jun. 25, 2019. ISA/Japan Patent Office.

*Primary Examiner* — Edward Tso
(74) *Attorney, Agent, or Firm* — Honigman LLP

(57) ABSTRACT

A configuration can be more easily realized in which the temperature of an auxiliary power source can be increased even in a low temperature environment. In the in-vehicle auxiliary power source control device, a control unit performs a charging operation of switching a first switch on and switching a second switch off, and a discharging operation of switching the first switch off and switching the second switch on. Also, the temperature of an auxiliary power source is raised by heat generated by a resistor unit due to the charging operation and the discharging operation performed by the control unit.

20 Claims, 6 Drawing Sheets

(51) Int. Cl.
| | |
|---|---|
| *H01M 10/615* | (2014.01) |
| *H01M 10/625* | (2014.01) |
| *H01M 10/633* | (2014.01) |
| *H01M 10/6571* | (2014.01) |
| *B60L 50/60* | (2019.01) |
| *H02J 7/00* | (2006.01) |
| *B60K 1/04* | (2019.01) |
| *H01M 10/44* | (2006.01) |
| *H01M 10/48* | (2006.01) |

(52) U.S. Cl.
CPC ......... *H01M 10/443* (2013.01); *H01M 10/48* (2013.01); *H01M 10/486* (2013.01); *H01M 10/615* (2015.04); *H01M 10/625* (2015.04); *H01M 10/633* (2015.04); *H01M 10/6571* (2015.04); *H02J 7/007192* (2020.01); *H01M 2220/20* (2013.01)

(58) Field of Classification Search
CPC ............. H01M 10/633; H01M 10/443; H01M 10/486; H01M 10/615; H01M 10/6571; H01M 2220/20; B60K 1/04; B60L 50/60; B60L 1/00
USPC ............... 320/104, 127, 132, 135, 136, 150; 307/64, 66
See application file for complete search history.

(56) References Cited

U.S. PATENT DOCUMENTS

| | | | |
|---|---|---|---|
| 2019/0229382 A1* | 7/2019 | Machida | ............... H02J 7/0069 |
| 2020/0168867 A1 | 5/2020 | Maekawa | |

* cited by examiner

IN-VEHICLE AUXILIARY POWER SOURCE CONTROL DEVICE AND IN-VEHICLE AUXILIARY POWER SOURCE DEVICE

CROSS-REFERENCE TO RELATED APPLICATIONS

This application is the U.S. national stage of PCT/JP2019/015279 filed on Apr. 8, 2019, which claims priority of Japanese Patent Application No. JP 2018-086315 filed on Apr. 27, 2018, the contents of which are incorporated herein.

TECHNICAL FIELD

The present disclosure relates to an in-vehicle auxiliary power source control device and in-vehicle auxiliary power source device.

BACKGROUND

With in-vehicle power source systems that use batteries or the like as the primary power sources thereof, configurations are widely known in which auxiliary power sources are provided so that the supply of power can be maintained even if a failure or the like occurs in the primary power source. In a typical configuration of such a system, if the supply of power from the primary power source is cut off, that state is detected and the supply of power is switched to the auxiliary power source, and thus the supply of power to a load is maintained by the auxiliary power source.

With the system described above, configurations are known in which an electric double layer capacitor or the like is used as the auxiliary power source, but the internal resistance of this type of auxiliary power source typically rises in low temperatures, which results in a decrease in the discharge capacity of the auxiliary power source. Accordingly, enabling sufficient power supply in low temperatures requires a greater number of capacitors than are needed in a room-temperature environment, which is a factor that can lead to an increase in the size of a device.

However, techniques such as those disclosed in JP 2003-223938A have been proposed to solve the types of problems described above. With the technique disclosed in JP 2003-223938A, a heating plate including a heater is arranged close to a secondary battery and the heat emitted from the heater heats the secondary battery in order to improve the characteristics of the secondary battery in low temperatures. However, a problem with the technique disclosed in JP 2003-2239381A is that providing a dedicated heater close to the secondary battery may lead to an increase in the number of components and to an increase in the size of a device.

The present disclosure was created in order to solve at least one of the problems described above, and an object thereof is to more easily realize a configuration in which the temperature of an auxiliary power source can be increased even in a low temperature environment.

SUMMARY

An auxiliary power source control device of a first aspect of the present disclosure is an auxiliary power source control device in an in-vehicle power source system that includes a main power source, an auxiliary power source that includes a power storage unit, and a power path that serves as a path through which power is supplied from the main power source to an in-vehicle load, the auxiliary power source control device including a serially configured component that is provided between the power path and a high potential side terminal of the auxiliary power source, and in which a resistor unit and a first switch are connected in series. A second switch includes one end that is electrically connected to a connection portion between the resistor unit and the first switch in the serially configured component, and another end that is electrically connected to a ground portion. A switching unit is provided in parallel to the serially configured component, and switches a state between the auxiliary power source and the power path between a discharge-allowing state in which discharge from the auxiliary power source is allowed, and a discharge-stopping state in which discharge from the auxiliary power source is stopped. A control unit controls the first switch, the second switch, and the switching unit; wherein the control unit performs a charging operation of switching the first switch on and switching the second switch off, and a discharging operation of switching the first switch off and switching the second switch on, and the temperature of the auxiliary power source is raised by heat generated by the resistor unit due to the charging operation and the discharging operation.

An in-vehicle auxiliary power source device of a second aspect of the present disclosure includes the auxiliary power source control device, and the auxiliary power source.

Advantageous Effects of Disclosure

With an in-vehicle auxiliary power source control device of a first aspect, a resistor unit (an inrush current limiting resistor) allows charging current to flow when the auxiliary power source is being charged and can be used to heat the auxiliary power source when the auxiliary power source is being charged or is discharging. Accordingly, it is possible to efficiently heat the auxiliary power source without relying on a special dedicated heater, and it is possible to more easily realize a configuration in which the temperature of an auxiliary power source can be effectively increased even in a low temperature environment.

With an in-vehicle auxiliary power source device of a second aspect, it is possible to achieve similar effects as that of the in-vehicle auxiliary power source control device of the first aspect.

DETAILED DESCRIPTION OF PREFERRED EMBODIMENTS

Figure 1:
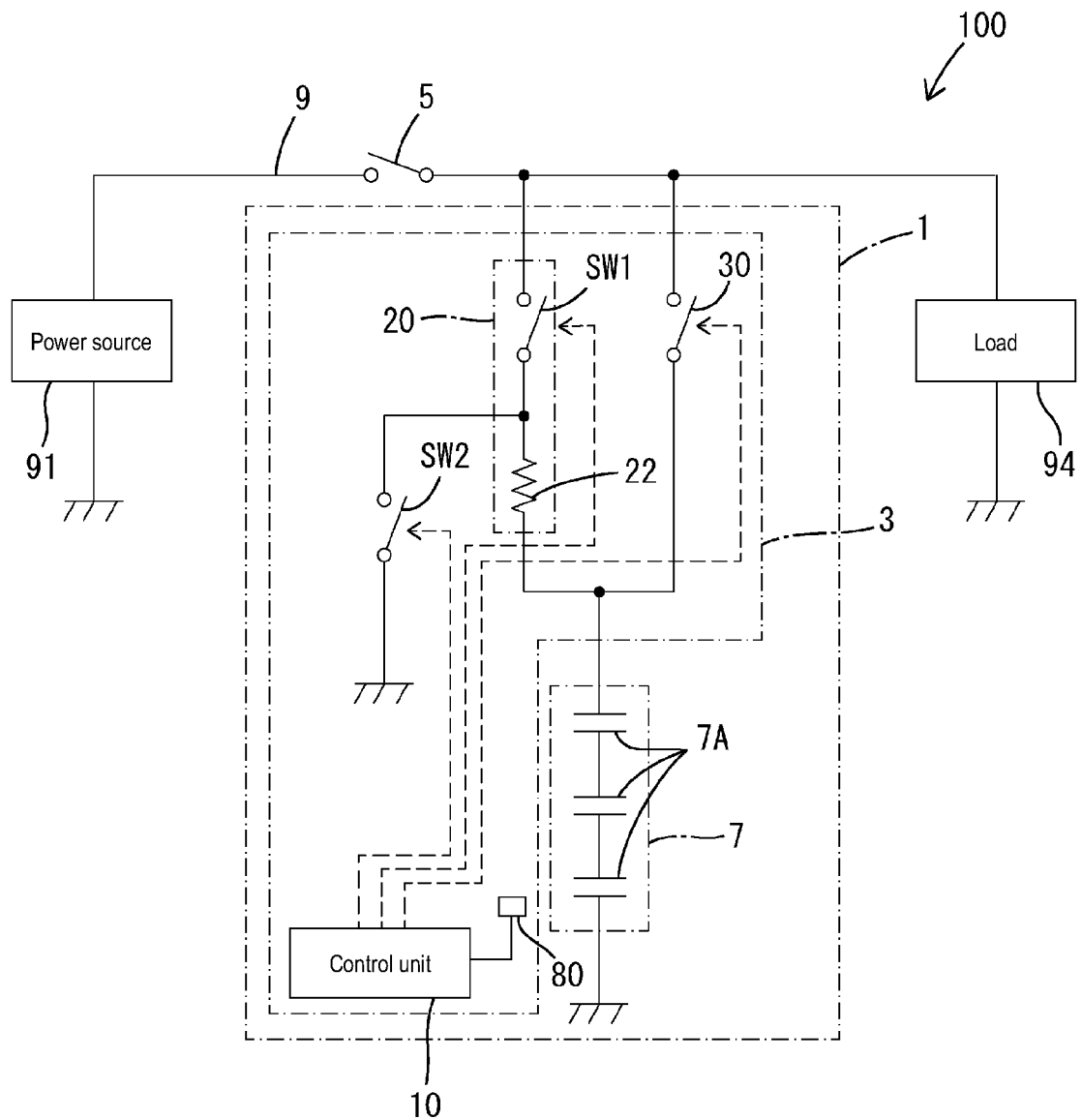
FIG. 1 is a block diagram that schematically illustrates a configuration of an in-vehicle power source system that includes an in-vehicle auxiliary power source control device of a first embodiment.

The following are desirable examples of the present disclosure. However, the present disclosure is not limited to the examples below.

The in-vehicle power source system described above may also include a temperature detection unit that detects the temperature of an auxiliary power source. Also, the control unit of the in-vehicle auxiliary power source control device may also start the charging operation in response to the establishment of a predetermined charging start condition, and after the charging operation is started, continue the charging operation if at least the temperature of the auxiliary power source is lower than a target temperature and the charging voltage of the auxiliary power source is lower than a target charging voltage.

With this configuration, when the temperature of the auxiliary power source is lower than the target temperature and the charging voltage of the auxiliary power source is lower than the target charging voltage, both a function of bringing the charging voltage close to the target charging voltage and a function of bringing the temperature of the auxiliary power source close to the target temperature can be realized by a common operation called "continuation of the charging operation", which is very advantageous in terms of efficiency.

The control unit, after the charging operation is started in response to the establishment of the charging start condition, if the temperature of the auxiliary power source has not reached the target temperature even though the charging voltage of the auxiliary power source reaches the target charging voltage, may also alternately perform the charging operation and the discharging operation repeatedly until at least the temperature of the auxiliary power source reaches the target temperature.

With this configuration, it is possible to use the charging and discharging of the auxiliary power source to raise the temperature thereof even after the charging voltage of the auxiliary power source reaches the target charging voltage. Moreover, when the temperature of the auxiliary power source increases even after the target charging voltage has been reached, the charging operation and the discharging operation are alternately repeated, and therefore it is possible to suppress over-charging of the auxiliary power source while controlling the increase in temperature by utilizing the charging and discharging of the auxiliary power source.

The control unit, after the charging operation is started in response to the establishment of the charging start condition, if the charging voltage of the auxiliary power source has not reached the target charging voltage even though the temperature of the auxiliary power source has reached the target temperature, may also intermittently switch the first switch on while keeping the second switch switched off until the charging voltage of the auxiliary power source reaches the target charging voltage.

With this configuration, it is possible to suppress an excessive rise in temperature while increasing the charging voltage, even if the temperature proceeds to rise before the charging voltage of the auxiliary power source reaches the target charging voltage and reaches the upper temperature limit.

The control unit may also be configured to stop the charging operation if the temperature of the auxiliary power source exceeds a predetermined upper temperature limit when the charging start condition is established.

With this configuration, suppressing an increase in temperature can be prioritized if the temperature of the auxiliary power source exceeds a predetermined upper temperature limit, and thus the protective effect thereof can be increased.

The control unit may also be configured to start the charging operation in response to the establishment of the charging start condition, and after the temperature of the auxiliary power source reaches the target temperature, alternately repeat stop control for stopping both the charging operation and the discharging operation, and heat retention control for switching between performing the discharging operation and the charging operation in response to the temperature of the auxiliary power source falling from the target temperature during the stop control.

With this configuration, it becomes easier to keep the temperature of the auxiliary power source close to the target temperature and it becomes easier to keep the charging voltage of the auxiliary power source close to the target charging voltage, after the temperature of the auxiliary power source reaches the target temperature and the charging voltage of the auxiliary power source reaches the target charging voltage.

The control unit may also be configured to switch between performing the discharging operation and the charging operation in the order of performing the charging operation until the charging voltage of the auxiliary power source reaches the target charging voltage after performing the discharging operation until the temperature of the auxiliary power source reaches the target temperature in the heat retention control.

With this configuration, if a system in each heat retention control is used in which the discharging operation is performed before the charging operation is performed, it is possible to recover the charging voltage by the charging operation in each heat retention control being performed afterwards and then shifting to the stop control, even if the charging voltage is lowered by the discharging operation performed earlier. Thus, it becomes easier to keep the charging voltage close to the target charging voltage in each stop control.

First Embodiment

The following is a description of a first embodiment that embodies the present disclosure.

An in-vehicle power source system 100 (hereinafter also referred to as "system 100") shown in FIG. 1 includes a main power source 91 that is the main power supply source, an auxiliary power source 7 as a power supply source that is different to the main power source 91, an auxiliary power source control device 3 that controls the auxiliary power source 7, a power path 9 that is a path for supplying power from the main power source 91, and a switch 5 that is provided on the power path 9, and the in-vehicle power source system 100 is configured to supply power to an in-vehicle load 94 (backup target, hereinafter also referred to as "load 94"). Also, an in-vehicle auxiliary power source device 1 (hereinafter also referred to as "auxiliary power source device 1") is constituted by the auxiliary power source 7 and the auxiliary power source control device 3.

The system 100 is configured to supply power from the main power source 91 to the load 94 when the state of power supply from the main power source 91 is normal, and to supply power from the auxiliary power source 7 to the load 94 when the state of power supply from the main power source 91 is abnormal.

In the present specification, "when the state of power supply from the main power source 91 is normal" means a state in which power that is greater than or equal to a predetermined value is supplied from the main power source 91 to the load 94, and "when the state of power supply from the main power source 91 is abnormal" means a state in which power that is greater than or equal to a predetermined value is not supplied from the main power source 91 to the load 94. Hereinafter, a case in which the voltage (potential) at a predetermined position on the power path 9 is greater than or equal to a given value when the switch 5 is on is described as "when the state of power supply from the main power source 91 is normal", and a case in which the voltage (potential) at the predetermined position on the power path 9 is less than the given value when the switch 5 is on is described as "when the state of power supply from the main power source 91 is abnormal".

The main power source 91 may be constituted by, for example, a commonly known in-vehicle battery such as a lead battery. The main power source 91 includes a high potential side terminal that is electrically connected to the power path 9, and applies output voltage of a predetermined value (12 V for example) to the power path 9. A low potential side terminal of the main power source 91 is electrically connected to a ground portion that is provided in the vehicle. Note that a fuse (not shown) is provided at a mid-way point along the power path 9. Also, the main power source 91 is electrically connected to a generator (not shown) and can be charged with power from the generator.

The load 94 is constituted by a commonly known in-vehicle electronic component. A suitable example of the load 94 is an electronic component whose supply of power is desirably maintained even if the supply of power from the main power source 91 is cut off, such as an ECU or an actuator in a shift-by-wire system, an ECU or an actuator in an electronic control brake system, or the like, and in-vehicle electronic components other than those listed are also applicable. The load 94 operates based on power supplied from the main power source 91 in the normal state described above, and operates based on power supplied from the auxiliary power source 7 in the abnormal state described above.

The power path 9 is a conduction path that constitutes the path for supplying power from the main power source 91 to the load 94, and one end of the power path 9 is electrically connected to the main power source 91, and the other end of the power path 9 is electrically connected to the load 94. The switch 5 is constituted by one or more semiconductor switches (such as FETs or transistors), mechanical relays, or the like, and has a function of switching between an on-state and an off-state. The switch 5 allows electrical current to flow from the main power source 91 to the load 94 when the switch 5 is on, and blocks the flow of power from the main power source 91 to the load 94 when the switch 5 is off, and therefore it is possible to supply power from the main power source 91 to the load 94 via the power path 9 when the switch 5 is on, and it is not possible to supply power from the main power source 91 to the load 94 via the power path 9 when the switch 5 is off.

The auxiliary power source device 1 includes the auxiliary power source control device 3 and the auxiliary power source 7, and is configured as a backup power source unit.

The auxiliary power source 7 is constituted by a power storage unit that includes a plurality of power storage cells 7A. The power storage cells 7A may be constituted by, for example, a commonly known power storage means such as electric double layer capacitors or the like. The auxiliary power source 7 is constituted by the plurality of power storage cells 7A connected in series, and functions as a power storage unit that produces a desired output voltage via the plurality of power storage cells 7A. In the auxiliary power source 7 (power storage unit), the terminal with the lowest potential (overall) is electrically connected to a ground, and said terminal is maintained at a predetermined low potential (0 V). Also, in the auxiliary power source 7 (power storage unit), the terminal with the highest potential overall is electrically connected to a serially configured component 20 and a switching unit 30 that will be described later, and a voltage corresponding to the amount of charge of the auxiliary power source 7 is applied to said terminal.

The auxiliary power source control device 3 and the auxiliary power source 7 constitute the auxiliary power source device 1, and the auxiliary power source control device 3 primarily includes the serially configured component 20, a second switch SW2, a control unit 10, a temperature detection unit 80, and the like.

The serially configured component 20 is constituted by a series circuit in which a resistor unit 22 and a first switch SW1 are connected in series, and has a configuration in which the resistor unit 22 and the first switch SW1 are connected in series between the power path 9 and the high potential side terminal of the auxiliary power source 7. The first switch SW1 is constituted by one or more semiconductor switches (such as FETs or transistors), mechanical relays, or the like, and has a function of switching between an on-state and an off-state. The first switch SW1 allows electrical current to flow, via the serially configured component 20, from the power path 9 to the auxiliary power source 7 and from the auxiliary power source 7 to the power path 9 when the first switch SW1 is on, and blocks the flow of electrical current, via the serially configured component 20, from the power path 9 to the auxiliary power source 7 and from the auxiliary power source 7 to power path 9 when the first switch SW1 is off. In the example shown in FIG. 1, one end of the first switch SW1 is electrically connected to the power path 9, and the other end of the first switch SW1 is electrically connected to one end of the resistor unit 22.

One end of the resistor unit 22 is electrically connected to the other end of the first switch SW1, the other end of the resistor unit 22 is electrically connected to one end (high potential side terminal) of the auxiliary power source 7, and the resistor unit 22 can function as an inrush current limiting resistor at the time of charging. Furthermore, with the present configuration, the resistor unit 22 is arranged close to the auxiliary power source 7 (for example, arranged at a position between the auxiliary power source 7 and the substrate on which the auxiliary power source 7 is mounted), and is configured such that the temperature of the auxiliary power source 7 can be raised by the heat emitted by the resistor unit 22 when the control unit 10 performs a charging operation or a discharging operation.

The second switch SW2 is constituted by one or more semiconductor switches (such as FETs or transistors), mechanical relays, or the like, and has a function of switching between an on-state and an off-state. One end of the second switch SW2 is electrically connected to a connection portion between the resistor unit 22 and the first switch SW1 in the serially configured component 20, and the other end of the second switch SW2 is electrically connected to a ground portion. The second switch SW2 allows electrical current to flow from the serially configured component 20 to the ground portion via the second switch SW2 when the second switch SW2 is on, and blocks the flow of electrical current from the serially configured component 20 to the ground portion when the second switch SW2 is off.

A switching unit 30 is provided in parallel to the serially configured component 20, and switches the state between the auxiliary power source 7 and the power path 9 between a discharge-allowing state in which discharge from the auxiliary power source 7 is allowed, and a discharge-stopping state in which discharge from the auxiliary power source 7 is stopped. The switching unit 30 is constituted by one or more semiconductor switches (such as FETs or transistors), mechanical relays, or the like, and has a function of switching between an on-state and an off-state. The switching unit 30 allows electrical current to flow, via the switching unit 30, from the power path 9 to the auxiliary power source 7 and from the auxiliary power source 7 to the power path 9 when the switching unit 30 is on, and blocks the flow of electrical current, via the switching unit 30, from the power path 9 to the auxiliary power source 7 and from the auxiliary power source 7 to the power path 9 when the switching unit 30 is off. In the example shown in FIG. 1, one end of the switching unit 30 (switch) is electrically connected to the power path 9, and the other end of the switching unit 30 is electrically connected to one end (high potential side terminal) of the auxiliary power source 7.

The temperature detection unit 80 may be constituted by, for example, a commonly known temperature sensor such as a thermistor, and the temperature detection unit 80 outputs a detection value showing the temperature of the position at which the temperature detection unit 80 is arranged. Specifically, the temperature detection unit 80 may be arranged on an outer surface layer of the power storage cells 7A, close to a terminal of the power storage cells 7A, close to the power storage cells 7A on the substrate on which the power storage cells 7A are installed, or the like, and outputs a detection value showing the temperature of the power storage cells 7A or the temperature close to the power storage cells 7A. Note that in the following description, the temperature of the power storage cells 7A or the temperature close to the power storage cells 7A will be referred to as "the temperature of the auxiliary power source 7".

The control unit 10 controls the operations of the first switch SW1, the second switch SW2, the switching unit 30, and the like. The control unit 10 may be constituted by a microcomputer for example, and may include an arithmetic unit such as a CPU, a memory such as a ROM or a RAM, an AD converter, and the like. The control unit 10 is supplied power from the main power source 91 or the auxiliary power source 7. Also, the control unit 10 can acquire a detection value of a voltage detection unit (not shown) that detects the voltage (charging voltage) of the high potential side terminal of the auxiliary power source 7, and can specify the charging voltage of the auxiliary power source 7. Furthermore, the control unit 10 can acquire the detection value of the temperature detection unit 80, and can specify the temperature of the auxiliary power source 7.

Next, discharge and charge control by the auxiliary power source control device 3 will be described.

The control unit 10 provided in the auxiliary power source control device 3 starts a charging operation (an operation of switching the first switch SW1 on and the second switch SW2 off) in response to the establishment of a predetermined charging condition. The phrase "establishment of a predetermined charging condition" may be, for example, "a start switch (such as an ignition switch) of the vehicle being switched from off to on", or may be any other condition (such as "the charging voltage of the auxiliary power source having fallen below a predetermined threshold value").

Figure 5:
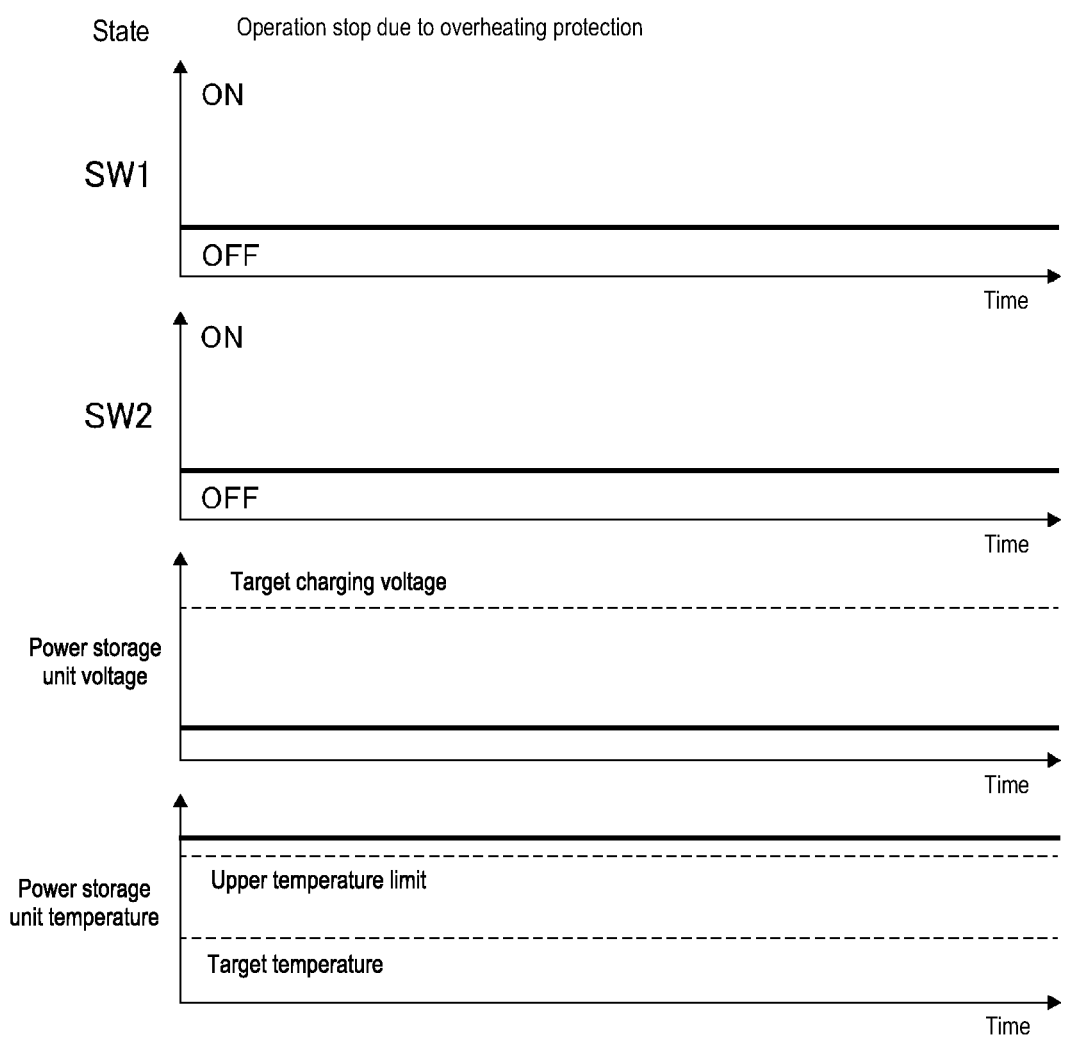
FIG. 5 is a timing chart that illustrates the chronological changes of the operation of the first switch, the operation of the second switch, charging voltage (power storage unit voltage) of the auxiliary power source, and the temperature (power storage unit temperature) of the auxiliary power source, when control relating to charging and discharging is performed in a fourth environment by the in-vehicle auxiliary power source control device of the first embodiment.

When a predetermined charging condition is established, the control unit 10 determines, based on the detection value provided by the temperature detection unit 80, whether or not the temperature of the auxiliary power source 7 has reached a predetermined upper temperature limit, and performs control such that the charging operation is not performed if the temperature of the auxiliary power source 7 has reached the predetermined upper temperature limit. In such a case, both of the switches SW1 and SW2 are kept off, and the state of the switches SW1 and SW2, and therefore the charging voltage (power storage unit voltage) of the auxiliary power source 7, and the temperature (power storage unit temperature) of the auxiliary power source 7 change over time as shown in FIG. 5. In such a case, the switches SW1 and SW2 are kept off and the resistor unit 22 does not generate heat in a state of conduction, and therefore a rise in the temperature (power storage unit temperature) of the auxiliary power source 7 is suppressed, and, depending on the surrounding environment, heat is dissipated from the auxiliary power source 7 and the temperature thereof falls.

In this way, the control unit 10 performs control so as to stop the charging operation if the temperature of the auxiliary power source 7 exceeds a predetermined upper temperature limit when the charging start condition is established.

If the temperature of the auxiliary power source 7 does not reach the predetermined upper temperature limit when a predetermined charging condition is established, the control unit 10 performs the charging operation, switches the first switch SW1 on, and switches the second switch SW2 off.

If the control unit 10 starts the charging operation in this way, it is conceivable that "'the timing at which the charging voltage of the auxiliary power source 7 reaches the target charging voltage' is before 'the timing at which the temperature of the auxiliary power source 7 reaches the target temperature'", and "'the timing at which the charging voltage of the auxiliary power source 7 reaches the target charging voltage' is after 'the timing at which the temperature of the auxiliary power source 7 reaches the target temperature'".

Figure 2:
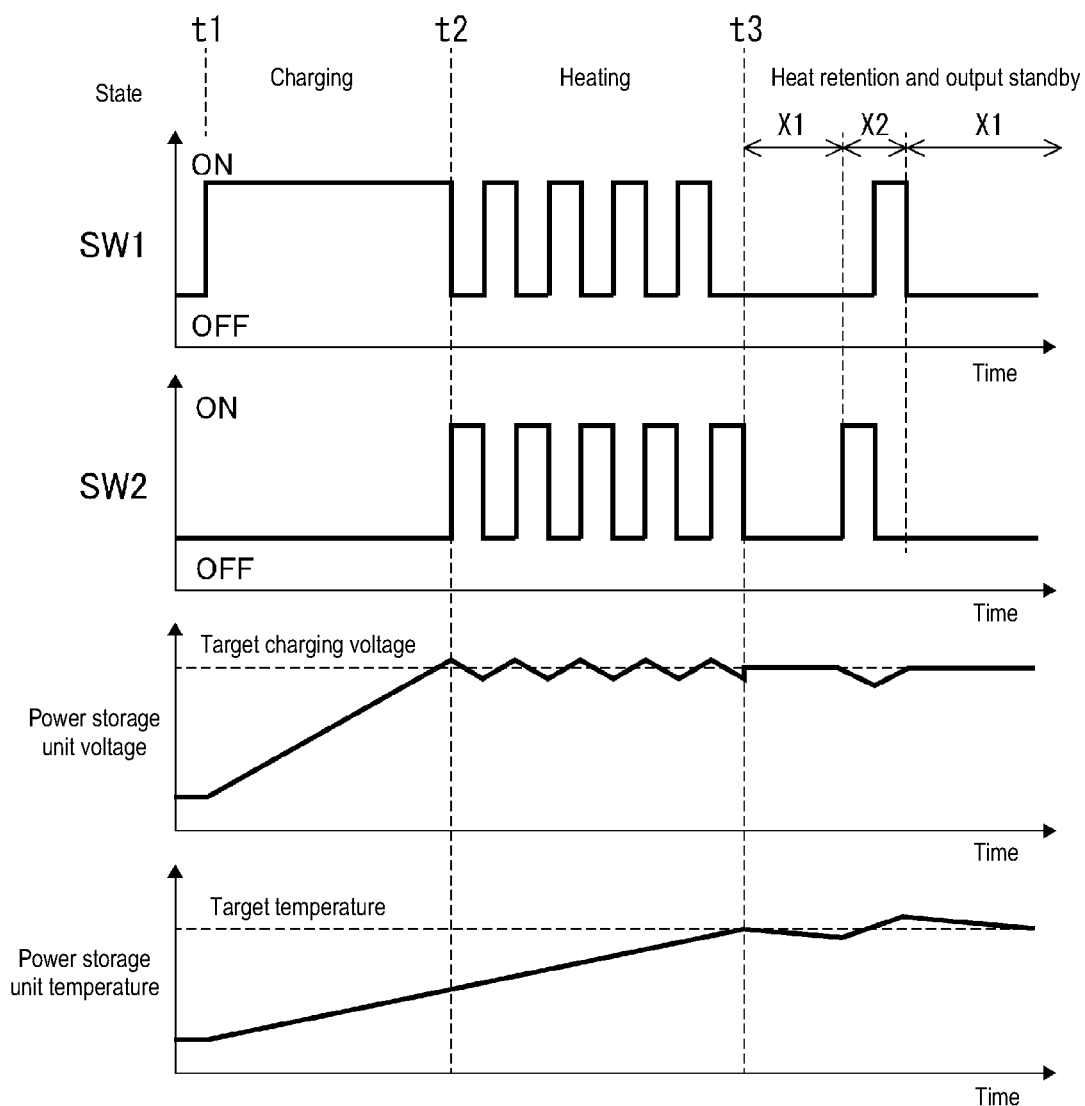
FIG. 2 is a timing chart that illustrates the chronological changes of the operation of a first switch, the operation of a second switch, charging voltage (power storage unit voltage) of the auxiliary power source, and the temperature (power storage unit temperature) of the auxiliary power source, when control relating to charging and discharging is performed in a first environment by the in-vehicle auxiliary power source control device of the first embodiment.

In a case in which the control unit 10 starts the charging operation, if "the timing at which the charging voltage of the auxiliary power source 7 reaches the target charging voltage" is before "the timing at which the temperature of the auxiliary power source 7 reaches the target temperature", then as shown in FIG. 2, charging continues from a time t1 when the charging operation is started to a time t2 when the charging voltage of the auxiliary power source 7 reaches the target charging voltage, and from the time t2 when the charging voltage of the auxiliary power source 7 has reached the target charging voltage, the previously described charging operation (an operation to switch the first switch SW1 on and switch the second switch SW2 off) and the discharging operation (an operation to switch the first switch SW1 off and switch the second switch SW2 on) are alternately performed repeatedly at fixed periods of time.

In this way the control unit 10 operates to start the charging operation in response to the establishment of a predetermined charging start condition, and after the charging operation is started, continue the charging operation if at least the temperature of the auxiliary power source is lower than a target temperature and the charging voltage of the auxiliary power source is lower than a target charging voltage. Furthermore, the control unit, after the charging operation is started in response to the establishment of the charging start condition, if the temperature of the auxiliary power source has not reached the target temperature even though the charging voltage of the auxiliary power source reaches the target charging voltage, operates to alternately perform the charging operation and the discharging operation repeatedly until at least the temperature of the auxiliary power source reaches the target temperature.

In the example shown in FIG. 2, the "alternately repeated operations" as described above are performed from the time t2, and the temperature of the auxiliary power source 7 reaches the target temperature and the charging voltage of the auxiliary power source 7 reaches the target charging voltage at a time t3. Accordingly, from the time t3, stop control for causing both the above-described charging operation and the above-described discharging operation to stop, and heat retention control (control for switching between performing the discharging operation and the charging operation in accordance with the fall of the temperature of the auxiliary power source 7 from the target temperature during the stop control) are alternately repeated. The example in FIG. 2 includes a period X1 that is a period of the stop control, and a period X2 that is a period of the heat retention control. In this example, the control unit 10 operates to switch between performing the discharging operation and the charging operation in the order of performing the charging operation until the charging voltage of the auxiliary power source 7 reaches the target charging voltage after performing the discharging operation until the temperature of the auxiliary power source 7 reaches the target temperature in the heat retention control. Note that the heat retention control can, for example, be performed when the temperature of the auxiliary power source 7 falls from the target temperature by a predetermined value or more.

Figure 3:
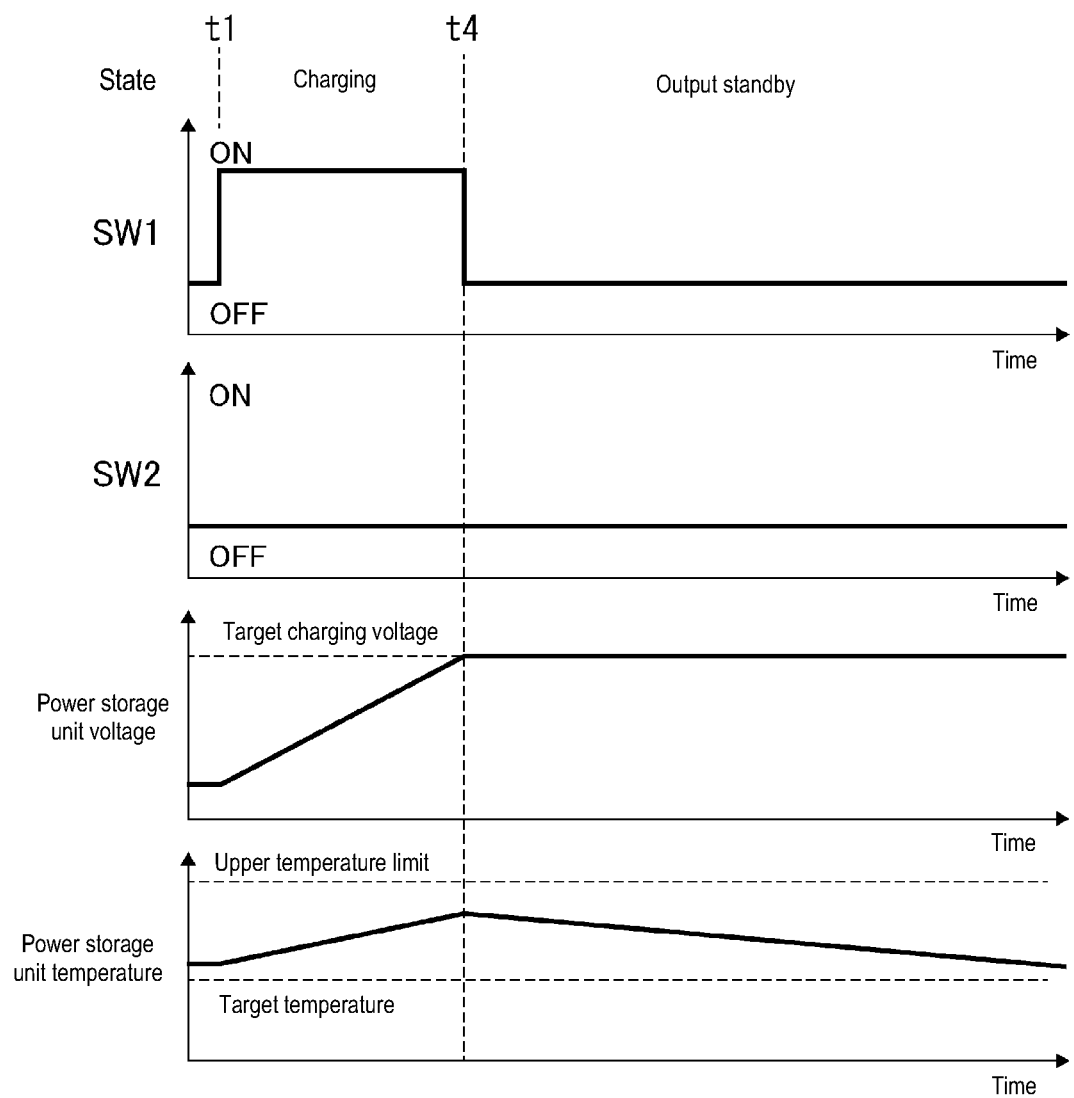
FIG. 3 is a timing chart that illustrates the chronological changes of the operation of the first switch, the operation of the second switch, charging voltage (power storage unit voltage) of the auxiliary power source, and the temperature (power storage unit temperature) of the auxiliary power source, when control relating to charging and discharging is performed in a second environment by the in-vehicle auxiliary power source control device of the first embodiment.

Note that in the example shown in FIG. 3, the control unit 10 starts the charging operation from the time t1 in response to the establishment of a predetermined charging start condition, and at a time t4, the temperature of the auxiliary power source 7 reaches the target temperature and the charging voltage of the auxiliary power source 7 reaches the target charging voltage. However, the temperature of the auxiliary power source 7 exceeds the target temperature even after a certain period of time has passed from the time t4, and therefore the above-described heat retention control is not performed during the period in which the temperature of the auxiliary power source 7 exceeds the target temperature.

Figure 4:
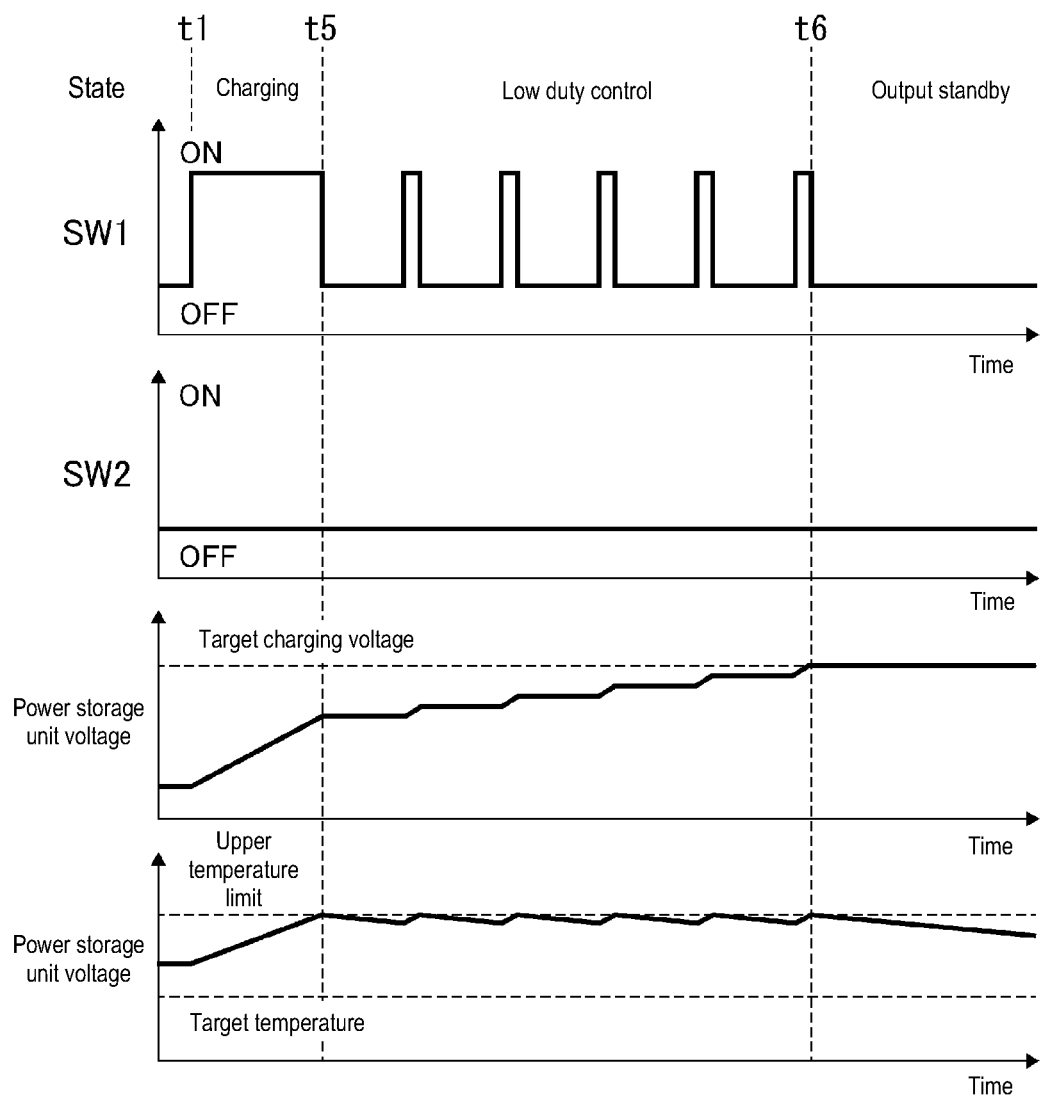
FIG. 4 is a timing chart that illustrates the chronological changes of the operation of the first switch, the operation of the second switch, charging voltage (power storage unit voltage) of the auxiliary power source, and the temperature (power storage unit temperature) of the auxiliary power source, when control relating to charging and discharging is performed in a third environment by the in-vehicle auxiliary power source control device of the first embodiment.

On the other hand, in the example in FIG. 4, after the control unit 10 starts the charging operation from the time t1 in response the establishment of the predetermined charging start condition, even if the temperature of the auxiliary power source 7 reaches a predetermined upper temperature limit that is higher than the target temperature is, the charging voltage of the auxiliary power source 7 does not reach the target charging voltage. In such a case, after a time t5 at which the upper temperature limit is reached, the second switch SW2 is kept off while the first switch SW1 is intermittently turned on until the charging voltage of the auxiliary power source 7 reaches the target charging voltage. As shown in FIG. 4, if such control is performed, the first switch SW1 may be turned on periodically at a predetermined low duty, or the first switch SW1 may be turned on each time the temperature of the auxiliary power source 7 falls from the upper limit temperature by a predetermined value or more. Such intermittent control continues until a time t6 when the charging voltage of the auxiliary power source 7 reaches the target charging voltage.

Note that the auxiliary power source control device 3 configured in this way performs control to use the switching unit 30 to discharge the auxiliary power source 7 when a predetermined condition is established. For example, the control unit 10 monitors the voltage of a predetermined position on the power path 9 when the switch 5 is on, keeps the switching unit 30 off if the voltage of the predetermined position of the power path 9 is greater than or equal to a given value when the switch 5 is on, switches the switching unit 30 on if the voltage of the predetermined position of the power path 9 is less than the given value when the switch 5 is on, and performs control to use the switching unit 30 to discharge the auxiliary power source 7. Note that the method shown here is merely one example in all respects, and a configuration is also possible in which the condition for switching the switching unit 30 from off to on is another condition inferring a failure of the main power supply 91.

Next, the effect of this configuration will be illustrated.

With the auxiliary power source control device 3 described above, the resistor unit 22 (an inrush current limiting resistor), which allows electrical current for charging to flow when the auxiliary power source 7 is being charged, can be used to heat the auxiliary power source 7 when the auxiliary power source 7 is being charged or is discharging. Accordingly, it is possible to efficiently heat the auxiliary power source 7 without relying on a special dedicated heater, and to more easily realize a configuration in which the temperature of the auxiliary power source 7 can be effectively increased even in a low temperature environment.

The in-vehicle power source system 100 includes the temperature detection unit 80 that is configured to detect the temperature of the auxiliary power source 7, and the control unit 10 of the in-vehicle auxiliary power source control device 3 operates to start the charging operation in response to the establishment of a predetermined charging start condition, and after the charging operation is started, continue the charging operation if at least the temperature of the auxiliary power source 7 is lower than a target temperature and the charging voltage of the auxiliary power source 7 is lower than a target charging voltage. With this configuration, when the temperature of the auxiliary power source 7 is lower than the target temperature and the charging voltage of the auxiliary power source 7 is lower than the target charging voltage, both a function of bringing the charging voltage close to the target charging voltage and a function of bringing the temperature of the auxiliary power source 7 close to the target temperature can be realized by a common operation called "continuation of the charging operation charging operation", which is very advantageous in terms of efficiency.

The control unit 10, after the charging operation is started in response to the establishment of the charging start condition, if the temperature of the auxiliary power source 7 has not reached the target temperature even though the charging voltage of the auxiliary power source 7 reaches the target charging voltage, operates to alternately perform the charging operation and the discharging operation repeatedly until at least the temperature of the auxiliary power source 7 reaches the target temperature. With this configuration, it is possible to use the charging and discharging of the auxiliary power source 7 to raise the temperature thereof even after the charging voltage of the auxiliary power source 7 reaches the target charging voltage. Moreover, when the temperature of the auxiliary power source 7 increases even after the target charging voltage has been reached, the charging operation and the discharging operation are alternately repeated, and therefore it is possible to suppress overcharging of the auxiliary power source 7 while controlling the rise in temperature by utilizing the charging and discharging of the auxiliary power source 7.

The control unit 10, after the charging operation is started in response to the establishment of the charging start condition, if the charging voltage of the auxiliary power source 7 has not reached the target charging voltage even though the temperature of the auxiliary power source 7 has reached the target temperature, may also intermittently switch the first switch on while keeping the second switch switched off until the charging voltage of the auxiliary power source 7 reaches the target charging voltage. With this configuration, it is possible to suppress an excessive rise in temperature while increasing the charging voltage, even if the temperature proceeds to rise before the charging voltage of the auxiliary power source 7 reaches the target charging voltage and reaches the upper temperature limit.

The control unit 10 stops the charging operation if the temperature of the auxiliary power source 7 exceeds a predetermined upper temperature limit when the charging start condition is established. With this configuration, suppressing an increase in temperature can be prioritized if the temperature of the auxiliary power source 7 exceeds a predetermined upper temperature limit, and thus the protective effect thereof can be increased.

The control unit 10 starts the charging operation in response to the establishment of the charging start condition, and after the temperature of the auxiliary power source reaches the target temperature, alternately repeats stop control for stopping both the charging operation and the discharging operation, and heat retention control for switching between performing the discharging operation and the charging operation in response to the temperature of the auxiliary power source 7 falling from the target temperature during the stop control. With this configuration, it becomes easier to keep the temperature of the auxiliary power source 7 close to the target temperature and it becomes easier to keep the charging voltage of the auxiliary power source 7 close to the target charging voltage, after the temperature of the auxiliary power source 7 reaches the target temperature and the charging voltage of the auxiliary power source 7 reaches the target charging voltage.

The control unit 10 switches between performing the discharging operation and the charging operation in the order of performing the charging operation until the charging voltage of the auxiliary power source 7 reaches the target charging voltage after performing the discharging operation until the temperature of the auxiliary power source 7 reaches the target temperature in the heat retention control. With this configuration, if a system in each heat retention control is used in which the discharging operation is performed before the charging operation is performed, it is possible to recover the charging voltage by the charging operation in each heat retention control being performed afterwards and then shifting to the stop control, even if the charging voltage is lowered by the discharging operation performed earlier. Thus, it becomes easier to keep the charging voltage close to the target charging voltage in each stop control.

Other Embodiments

The present disclosure is not limited to the embodiment described above and illustrated in the drawings, and the following examples are included in the technical scope of the present disclosure.

In the first embodiment, a lead battery is used as the main power source 91, but the present disclosure is not limited to this configuration and in any of the examples in the present specification, other power source means (such as other commonly known power storage means and power generation means) may be used for the main power source 91 in place of, or in combination with, a lead battery. The number of power source means that constitute the main power source 91 is not limited to one, and configurations are also possible in which the main power source 91 is constituted by a plurality of power source means.

In the first embodiment, an electric double layer capacitor (EDLC) is used as the auxiliary power source 7, but the present disclosure is not limited to this configuration and in any of the examples in the present specification, other power storage means may be used for the auxiliary power source 7, such as a lithium ion battery, a lithium ion capacitor, or a nickel hydrogen rechargeable battery. Also, the number of power storage means that constitute the auxiliary power source 7 is not limited to one, and configurations are also possible in which the auxiliary power source 7 is constituted by a plurality of power storage means.

Figure 6:
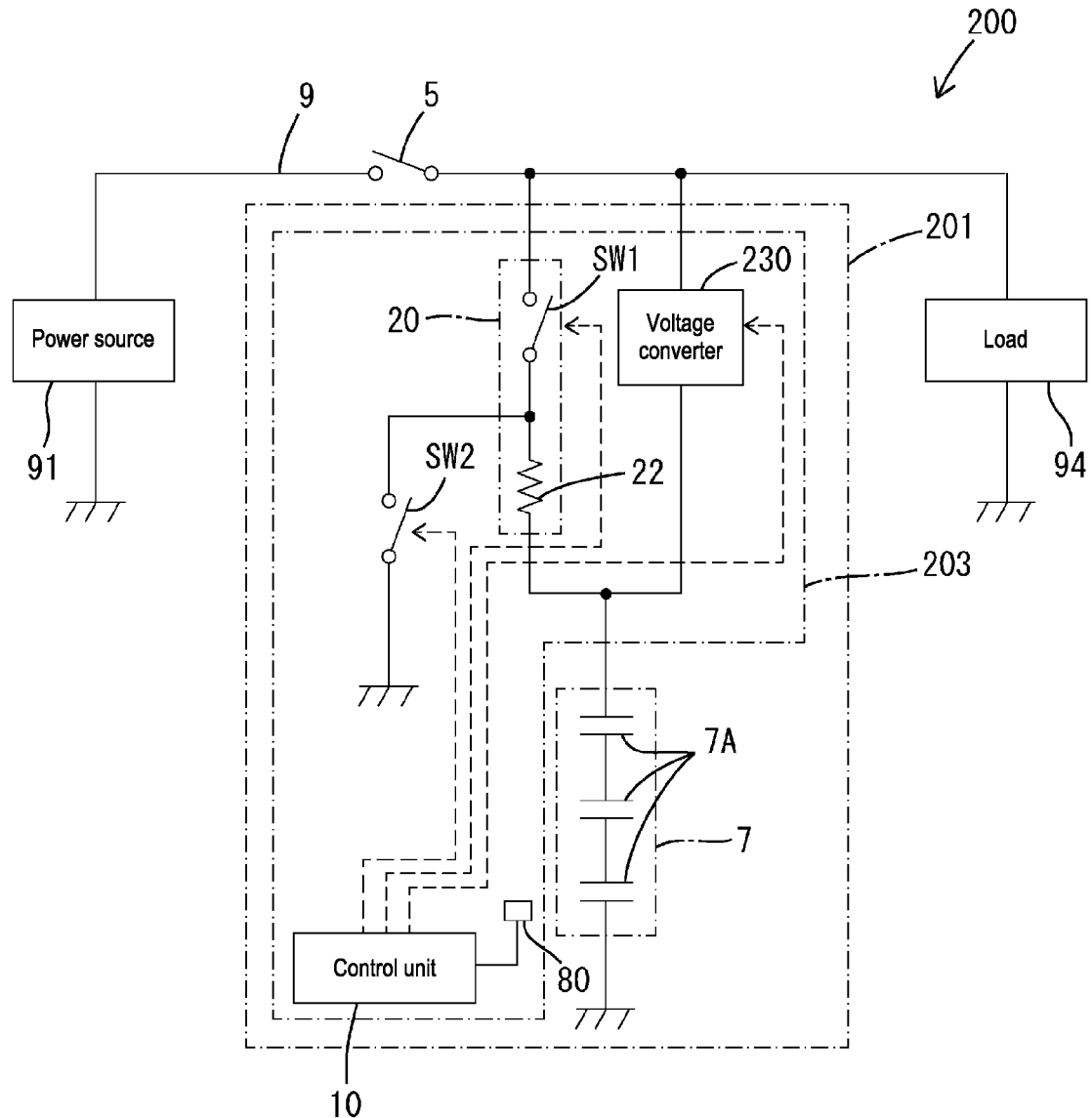
FIG. 6 is a block diagram that schematically illustrates a configuration of the in-vehicle power source system that includes the in-vehicle auxiliary power source control device according to another embodiment.

In the first embodiment, the switching unit 30 is exemplified as being constituted by a switch, but configurations are also possible in which the switching unit 30 is replaced with a switching unit 230 that is constituted by a voltage converter as shown in FIG. 6. The switching unit 230 (voltage converter) may be constituted by a boosting type DC-DC converter that boosts the output voltage of the auxiliary power source 7 and applies the boosted output voltage to the power path 9, may be constituted by a step-down DC-DC converter that steps down the output voltage of the auxiliary power source 7 and applies the stepped-down output voltage to the power path 9, or may be constituted by a stepdown-boost DC-DC converter that includes a boosting function and a step-down function. Note that an in-vehicle power source system 200 as shown in FIG. 6 is different to the in-vehicle power source system 100 shown in FIG. 1 only in that the switching unit 30 is replaced by the switching unit 230, an auxiliary power source device 201 is different to the auxiliary power source device 1 shown in FIG. 1 only in that the switching unit 30 is replaced by the switching unit 230, and an auxiliary power source control device 203 is different to the auxiliary power source control device 3 shown in FIG. 1 only in that the switching unit 30 is replaced by the switching unit 230.

The invention claimed is:

1. An auxiliary power source control device in an in-vehicle power source system that includes a main power source, an auxiliary power source that includes a power storage unit, and a power path that serves as a path through which power is supplied from the main power source to an in-vehicle load, the auxiliary power source control device comprising:

a serially configured component that is provided between the power path and a high potential side terminal of the auxiliary power source, and in which a resistor unit and a first switch are connected in series;

a second switch of which one end is electrically connected to a connection portion between the resistor unit and the first switch in the serially configured component, and of which another end is electrically connected to a ground portion;

a switching unit that is provided in parallel to the serially configured component, and switches a state between the auxiliary power source and the power path between a discharge-allowing state in which discharge from the auxiliary power source is allowed, and a discharge-stopping state in which discharge from the auxiliary power source is stopped; and a control unit that controls the first switch, the second switch, and the switching unit, wherein the control unit performs a charging operation of switching the first switch on and switching the second switch off, and a discharging operation of switching the first switch off and switching the second switch on, and a temperature of the auxiliary power source is raised by heat generated by the resistor unit due to the charging operation and the discharging operation.

2. The auxiliary power source control device according to claim 1, wherein the in-vehicle power source system includes a temperature detection unit that is configured to detect the temperature of the auxiliary power source, and the control unit starts the charging operation in response to an establishment of a predetermined charging start condition, and after the charging operation is started, continues the charging operation if at least the temperature of the auxiliary power source is lower than a target temperature and the charging voltage of the auxiliary power source is lower than a target charging voltage.

3. The in-vehicle auxiliary power source control device according to claim 2, wherein the control unit, after the charging operation is started in response to the establishment of the charging start condition, if the temperature of the auxiliary power source has not reached the target temperature even though the charging voltage of the auxiliary power source reaches the target charging voltage, alternately performs the charging operation and the discharging operation repeatedly until at least the temperature of the auxiliary power source reaches the target temperature.

4. The in-vehicle auxiliary power source control device according to claim 3, wherein the control unit, after the charging operation is started in response to the establishment of the charging start condition, if the charging voltage of the auxiliary power source has not reached the target charging voltage even though the temperature of the auxiliary power source has reached the target temperature, intermittently switches the first switch on while keeping the second switch switched off until the charging voltage of the auxiliary power source reaches the target charging voltage.

5. The in-vehicle auxiliary power source control device according to claim 3, wherein the control unit stops the charging operation if the temperature of the auxiliary power source exceeds a predetermined upper temperature limit when the charging start condition is established.

6. The in-vehicle auxiliary power source control device according to claim 3, wherein the control unit starts the charging operation in response to the establishment of the charging start condition, and after the temperature of the auxiliary power source reaches the target temperature, alternately repeats stop control for stopping both the charging operation and the discharging operation, and heat retention control for switching between preforming the discharging operation and the charging operation in response to the temperature of the auxiliary power source falling from the target temperature during the stop control.

7. The in-vehicle auxiliary power source control device according to claim 2, wherein the control unit, after the charging operation is started in response to the establishment of the charging start condition, if the charging voltage of the auxiliary power source has not reached the target charging voltage even though the temperature of the auxiliary power source has reached the target temperature, intermittently switches the first switch on while keeping the second switch switched off until the charging voltage of the auxiliary power source reaches the target charging voltage.

8. The in-vehicle auxiliary power source control device according to claim 7, wherein the control unit stops the charging operation if the temperature of the auxiliary power source exceeds a predetermined upper temperature limit when the charging start condition is established.

9. The in-vehicle auxiliary power source control device according to claim 7, wherein the control unit starts the charging operation in response to the establishment of the charging start condition, and after the temperature of the auxiliary power source reaches the target temperature, alternately repeats stop control for stopping both the charging operation and the discharging operation, and heat retention control for switching between preforming the discharging operation and the charging operation in response to the temperature of the auxiliary power source falling from the target temperature during the stop control.

10. The in-vehicle auxiliary power source control device according to claim 2, wherein the control unit stops the charging operation if the temperature of the auxiliary power source exceeds a predetermined upper temperature limit when the charging start condition is established.

11. The in-vehicle auxiliary power source control device according to claim 10, wherein the control unit starts the charging operation in response to the establishment of the charging start condition, and after the temperature of the auxiliary power source reaches the target temperature, alternately repeats stop control for stopping both the charging operation and the discharging operation, and heat retention control for switching between preforming the discharging operation and the charging operation in response to the temperature of the auxiliary power source falling from the target temperature during the stop control.

12. The in-vehicle auxiliary power source control device according to claim 2, wherein the control unit starts the charging operation in response to the establishment of the charging start condition, and after the temperature of the auxiliary power source reaches the target temperature, alternately repeats stop control for stopping both the charging operation and the discharging operation, and heat retention control for switching between preforming the discharging operation and the charging operation in response to the temperature of the auxiliary power source falling from the target temperature during the stop control.

13. The in-vehicle auxiliary power source control device according to claim 12, wherein the control unit switches between performing the discharging operation and the charging operation in the order of performing the charging operation until the charging voltage of the auxiliary power source reaches the target charging voltage after performing the discharging operation until the temperature of the auxiliary power source reaches the target temperature in the heat retention control.

14. An in-vehicle auxiliary power source device comprising:
the auxiliary power source control device according to claim 1; and
the auxiliary power source.

15. The in-vehicle auxiliary power source device according to claim 14, wherein the in-vehicle power source system includes a temperature detection unit that is configured to detect the temperature of the auxiliary power source, and
the control unit starts the charging operation in response to an establishment of a predetermined charging start condition, and after the charging operation is started, continues the charging operation if at least the temperature of the auxiliary power source is lower than a target temperature and the charging voltage of the auxiliary power source is lower than a target charging voltage.

16. The in-vehicle auxiliary power source device according to claim 15, wherein the control unit, after the charging operation is started in response to the establishment of the charging start condition, if the temperature of the auxiliary power source has not reached the target temperature even though the charging voltage of the auxiliary power source reaches the target charging voltage, alternately performs the charging operation and the discharging operation repeatedly until at least the temperature of the auxiliary power source reaches the target temperature.

17. The in-vehicle auxiliary power source device according to claim 15, wherein the control unit, after the charging operation is started in response to the establishment of the charging start condition, if the charging voltage of the auxiliary power source has not reached the target charging voltage even though the temperature of the auxiliary power source has reached the target temperature, intermittently switches the first switch on while keeping the second switch switched off until the charging voltage of the auxiliary power source reaches the target charging voltage.

18. The in-vehicle auxiliary power source device according to claim 15, wherein the control unit stops the charging operation if the temperature of the auxiliary power source exceeds a predetermined upper temperature limit when the charging start condition is established.

19. The in-vehicle auxiliary power source device according to claim 15, wherein the control unit starts the charging operation in response to the establishment of the charging start condition, and after the temperature of the auxiliary power source reaches the target temperature, alternately repeats stop control for stopping both the charging operation and the discharging operation, and heat retention control for switching between preforming the discharging operation and the charging operation in response to the temperature of the auxiliary power source falling from the target temperature during the stop control.

20. The in-vehicle auxiliary power source device according to claim 19, wherein the control unit switches between performing the discharging operation and the charging operation in the order of performing the charging operation until the charging voltage of the auxiliary power source reaches the target charging voltage after performing the discharging operation until the temperature of the auxiliary power source reaches the target temperature in the heat retention control.

* * * * *